No. 656,322. Patented Aug. 21, 1900.
L. GROTE.
GLASS BOTTLE BLOWING MACHINE.
(Application filed July 17, 1900.)
(No Model.)
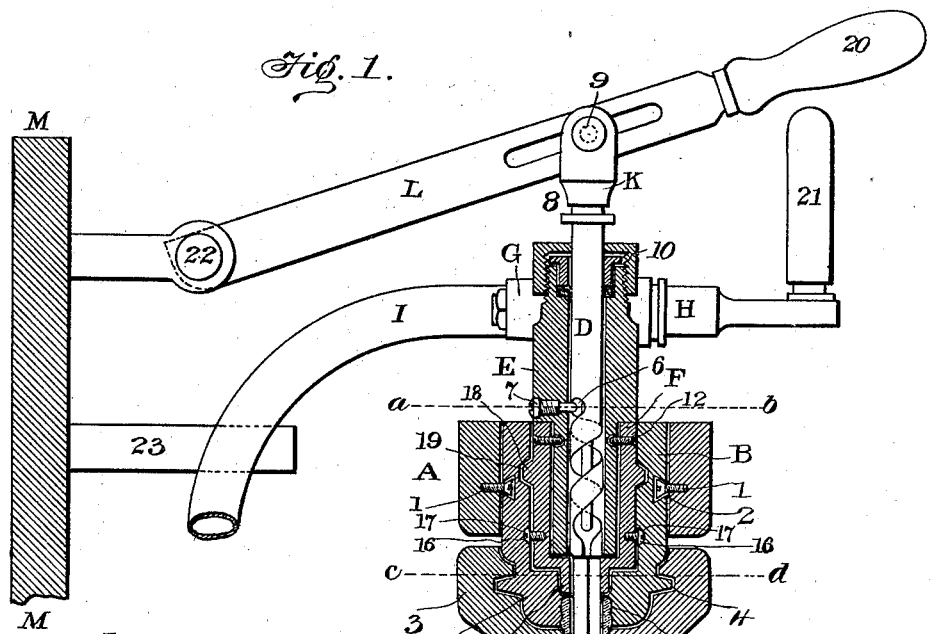
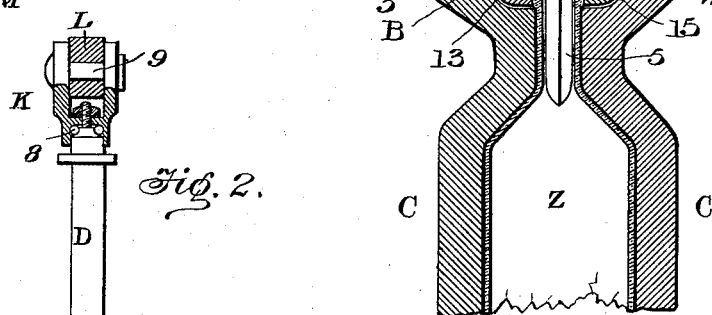
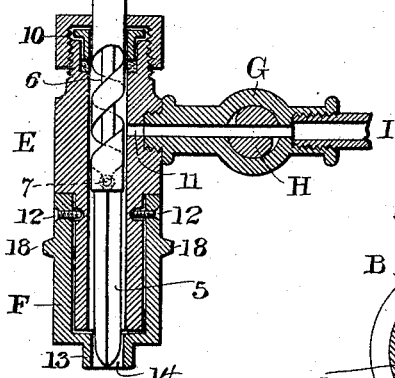
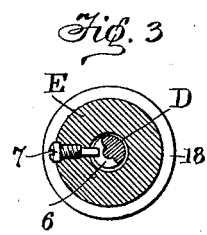
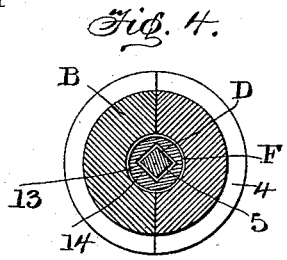

UNITED STATES PATENT OFFICE.

LUDWIG GROTE, OF LONDON, ENGLAND, ASSIGNOR TO THE GROTE BOTTLE MACHINE COMPANY, OF JERSEY CITY, NEW JERSEY.

GLASS-BOTTLE-BLOWING MACHINE.

SPECIFICATION forming part of Letters Patent No. 656,322, dated August 21, 1900.

Original application filed March 5, 1900, Serial No. 7,376. Divided and this application filed July 17, 1900. Serial No. 23,982.

(No model.)

*To all whom it may concern:*

Be it known that I, LUDWIG GROTE, a subject of the Emperor of Germany, residing at 84<sup>B</sup> East India Dock road, London, England, have invented a new and useful Improvement in Glass-Bottle-Blowing Machines, of which the following is a specification.

This invention relates to the manufacture of glass bottles as practiced in part by means of machinery. In my specification forming part of United States Letters Patent No. 628,313, dated the 4th day of July, 1899, I set forth such machinery comprising molds in which the proper quantity of glass for the parison is measured and the lip portion or head of the bottle is cast in inverted position, a mouth-forming and air-admitting plunger, means for reversing and exposing the parison, and finishing-molds within which the blowing of the bottle by compressed air is completed. In the present specification and another forming part of my application for United States Letters Patent filed the 5th day of March, 1900, and allowed the 22d day of May, 1900, Serial No. 7,376, of which this is a division, improvements are set forth relating primarily to said patented machine, but applicable in part to other glass-bottle-blowing machines. One of said improvements set forth in the other specification above referred to comprises a rotatable plunger of peculiar construction for forming the initial cavity in the glass and shaping the mouth or interior of the head and neck of the bottle. The improvement that is the subject-matter of the present specification relates to the production of "turned" bottles, in which the mold-marks are removed from the glass and it is given a higher finish by rotating it within the finishing body-mold, and this improvement consists in the combination, with a rotatable plunger, of a head-mold or "neck-mold," rotatable therewith, and means for rotating the same, and thereby turning the bottle within the finishing-mold.

A sheet of drawings accompanies this specification as part thereof.

Figure 1 of these drawings is a sectional view of certain parts of a glass-bottle-blowing machine hereinafter described, illustrating the operation of making a turned bottle. Fig. 2 is a section in a vertical plane at right angles to that of Fig. 1, showing the plunger at the opposite extreme of its stroke and omitting the molds shown in Fig. 1. Fig. 3 represents a cross-section through the plunger and its casing on the line $a\,b$, Fig. 1; and Fig. 4 represents a cross-section through the plunger, plunger-casing attachment, and neck-mold on the line $c\,d$, Fig. 1.

Like letters and numerals refer to like parts in all the figures, and the parts are hereinafter described in the position in which they are shown in Figs. 1 and 2.

The general features of the improved machine may be such as are set forth in the amended specification of said application for United States Patent filed the 5th day of March, 1900, and allowed the 22d day of May, 1900, Serial No. 7,376, of which this is a division, or of any approved construction that is not inconsistent with the specific improvement herein set forth and claimed.

A may represent the outer portion of the head-mold or neck-mold, and B the inner portion or mold proper; C, the finishing body-mold or body and bottom mold; D, a rotatable axial plunger; E, the plunger-casing; F, a ferrule-shaped attachment to said casing; G the shell, and H the spigot or plug, of an air-cock, and I an air-conduit in communication with a source of compressed air and with said air-cock.

Each of the portions A and B of the head-mold or neck-mold is bisected, and the two portions are connected with each other by a swivel-joint formed by the undercut heads of two or more screws 1, projecting within the parts of the outer portion A, hereinafter termed the "neck-mold support," and a circumferential dovetailed groove 2, common to the two parts of the inner portion or mold proper B, hereinafter termed the "neck-mold," which is thus rendered rotatable within said support A and at the same time adapted to open and close therewith.

The finishing-mold C may be of the construction set forth in said previous specification or of any suitable make. Its upper portion at least is bisected, as is customary, and it is alined with the neck-mold and closed around the glass Z, Fig. 1, for the final blowing of the bottle. It may be held in alinement with the neck-mold by a recessed neck end 3, embracing the lower end of the neck-mold B, including a circumferential locking projection 4 on the latter, as in Fig. 1, or in any approved way, but so as not to interfere with the rotation of said neck-mold B.

The rotatable plunger D is preferably identical with one set forth and claimed in said companion specification of which this is a division, its distinguishing features being an imperforate and "flattened" mouth-forming portion or point 5, preferably square or triangular in cross-section, and a rapid-pitch spiral groove 6, the latter coacting with a screw-point stud 7 within the casing E, and the plunger being coupled by a swivel-joint 8, as in Fig. 2, to a yoke K, which in turn is connected by a pin-and-slot coupling 9, as in Fig. 1, to a hand-lever L, for example, as means for reciprocating the plunger and permitting its rotation. The rotary movement is effected by the coaction of said spiral groove 6 and stud 7 when the plunger is reciprocated.

The plunger-casing E has a stuffing-box 10 at its upper end to form an air-tight joint around the upper end of the reciprocating and rotating plunger D and a lateral opening 11, Fig. 2, keeping its interior in communication with that of the air-cock casing G and by way of the passages of the air-cock plug H with the interior of the air-conduit I when the air-cock is opened more or less. The plunger-casing E, air-cock casing G, and air-conduit I are rigidly connected with each other by screw-joints, as in Fig. 2, and the air-cock shown is of the construction set forth in said companion specification.

The attachment F of the plunger-casing E embraces said casing from the upper level of the neck-mold to the lower extremity of the casing, this portion of the casing being conveniently of reduced diameter, so that the outer diameter of the attachment need not exceed that of the casing. The two are held together against longitudinal displacement by a stud-and-groove swivel-joint 12. Its lower end, contracted beneath that of the casing and elongated in the form of a nipple 13, Figs. 2 and 4, is provided with a bore 14 of the same cross-section as the plunger-point 5, and the two are thus permitted and compelled to rotate together. The nipple 13 externally is round in cross-section, as shown in Fig. 4, which facilitates its coaction with the matrical cavity 15 of the neck-mold to shape the lip of the bottle.

To compel the neck-mold B and therewith the bottle to rotate with the plunger D and plunger-casing attachment F, the latter is provided, for example, with two or more screws 16, Fig. 1, having projecting heads, and the interior of said neck-mold with isolated sockets 17 to receive said heads, in addition to the customary circumferential locking projection 18 and counterpart groove 19 to prevent endwise displacement or separation.

With a partly-formed bottle Z suspended from the neck-mold B and inclosed within its matrical cavity and that of the finishing-mold C, as in Fig. 1, the lever L is operated by means of its handle 20 before fully opening the air-cock G H, as in Fig. 2, by its handle 21, and the plunger D, plunger-casing attachment F, and neck-mold B are thus caused to rotate, and therewith the partly-formed bottle within the mold C. All signs of the longitudinal joint in this mold may thus be obliterated, as in the hand operation of making turned bottles. Bottles so finished cannot of course have molded inscriptions thereon. The blowing of the bottle is completed within the mold C, and the finished bottle is released by opening this mold and the neck-mold B, the plunger D being retracted, as in Fig. 2.

The hand-lever L is conveniently hinged at 22, Fig. 1, in common with the neck-mold support A, to a rotatable face-plate M, which also carries the plunger-casing E, with its attachment F, the air-cock G H, and the air-conduit I, as represented by the conduit-support 23, Fig. 1. By turning said face-plate one hundred and eighty degrees on its horizontal axis the parts above described, excepting only said mold C, are inverted for the parison-casting and mouth-forming operations, to which the present invention does not relate.

Having thus described said improvement, I claim as my invention and desire to patent under this specification—

1. In a glass-bottle-blowing machine, the combination of a plunger having a flattened point, means for reciprocating and rotating the same, a plunger-casing, a ferrule-shaped attachment to said casing, through which said point reciprocates and which is rotatable therewith and turned thereby, a rotatable neck-mold turned by said attachment, and a finishing-mold alined with said neck-mold and within which the bottle is turned by said neck-mold.

2. In a glass-bottle-blowing machine, the combination with a face-plate, a casing carried by said face-plate, and an air-conduit communicating with said casing, of a rotatable plunger arranged to slide in said casing, a ferrule-shaped attachment rotatably mounted upon said casing and fitted to said plunger to turn therewith, a neck-mold inclosing said attachment and secured thereto, a support for said neck-mold carried by said face-plate and embracing the neck-mold, another mold arranged in line with the plunger and neck-mold, and means for reciprocating and rotating said plunger, substantially as hereinbefore specified.

LUDWIG GROTE.

Witnesses:
WILLIAM J. HARVEY,
ANDREW FOULD, Jr.